US012683886B2

(12) United States Patent
Vasseur et al.

(10) Patent No.: US 12,683,886 B2
(45) Date of Patent: Jul. 14, 2026

(54) GENERATING NETWORK SCENARIOS TO TRAIN AN LLM-BASED NETWORK TROUBLESHOOTING AGENT

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/388,016

(22) Filed: Nov. 8, 2023

(65) Prior Publication Data

US 2025/0150377 A1     May 8, 2025

(51) Int. Cl.
*H04L 43/50* (2022.01)
*H04L 41/0631* (2022.01)
(52) U.S. Cl.
CPC .......... *H04L 43/50* (2013.01); *H04L 41/0631* (2013.01)

(58) Field of Classification Search
CPC ............................ H04L 43/50; H04L 41/0631
See application file for complete search history.

(56) References Cited

U.S. PATENT DOCUMENTS

| | | | |
|---|---|---|---|
| 11,875,240 B1 * | 1/2024 | Bosnjakovic | ....... G06F 16/3329 |
| 2019/0050239 A1 | 2/2019 | Caldwell et al. | |
| 2020/0279180 A1 | 9/2020 | Yu et al. | |
| 2022/0309250 A1 | 9/2022 | Das et al. | |
| 2023/0047346 A1 | 2/2023 | Daniel et al. | |
| 2023/0316298 A1 | 10/2023 | Singhal et al. | |
| 2024/0378395 A1 * | 11/2024 | Sommers | ................ H04L 41/08 |

* cited by examiner

*Primary Examiner* — Philip C Lee
(74) *Attorney, Agent, or Firm* — Lee & Hayes, P.C.

(57) ABSTRACT

In one implementation, a device receives feedback from a user regarding an output of a large language model-based troubleshooting agent for a network that the large language model-based troubleshooting agent generates in response to an input request from the user. The device determines a network scenario associated with the input request and the output. The device causes, based on the feedback, the network scenario to be replicated in a test network. The device updates the large language model-based troubleshooting agent in part by using the large language model-based troubleshooting agent to assess the network scenario in the test network.

20 Claims, 10 Drawing Sheets

600

TEST CASE
620

1. Question
2. Scenario

AGENT
TRAINING
FRAMEWORK
510

SME
QUEUE
618

IRREPRODUCIBLE
616

SCENARIO
GENERATOR
ENGINE
506

DATA
STORE
614

TELEMETRY 612:
1. Question
2. Sequence of actions
3. Answer
4. User feedback
5. Network Context Data

AGENT
502

QUESTION 604

ANSWER 606

FEEDBACK 608

END USER
602

DEPLOYMENTS 610

GENERATING NETWORK SCENARIOS TO TRAIN AN LLM-BASED NETWORK TROUBLESHOOTING AGENT

TECHNICAL FIELD

The present disclosure relates generally to generating network scenarios to train a large language model (LLM)-based network troubleshooting agent.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs.

However, simply asking an LLM-based agent to perform a complex task, such as network troubleshooting, first requires the agent to solve simpler problems. As an example, before figuring out that a rogue access point is interfering with legitimate access points, the agent must be able to discover basic data points about the network, such as the location and service set identifier (SSID) of the user, listing access points in their location, accessing analyzer tools to identify the rogue access point, etc.

In addition, LLM-based troubleshooting agents are, by default, unable to learn from past experiences. Consequently, such agents may continue to make the same mistakes over and over, without a mechanism to correct the agents over time.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
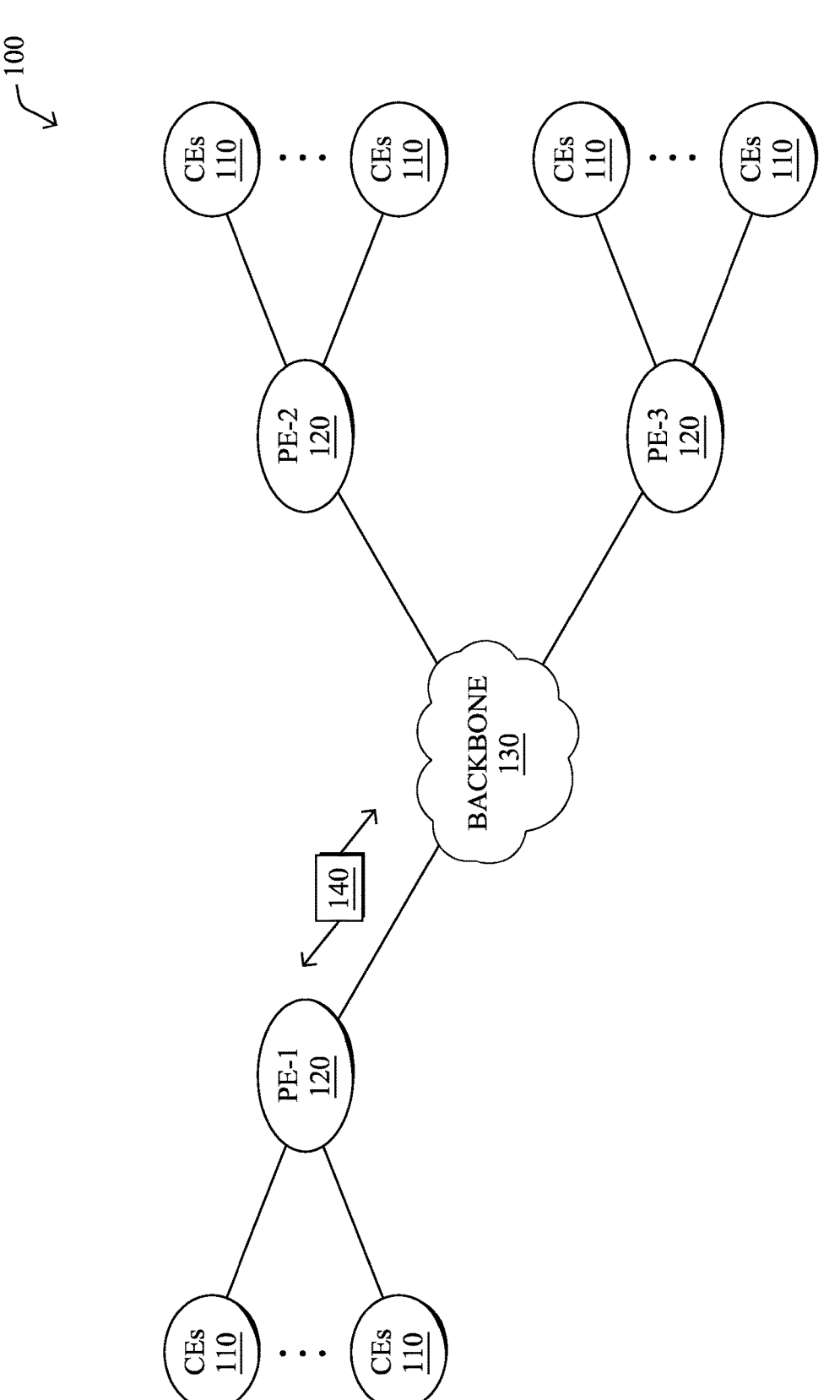
FIGS. 1A-1B illustrate an example communication network.

According to one or more implementations of the disclosure, a device receives feedback from a user regarding an output of a large language model-based troubleshooting agent for a network that the large language model-based troubleshooting agent generates in response to an input request from the user. The device determines a network scenario associated with the input request and the output. The device causes, based on the feedback, the network scenario to be replicated in a test network. The device updates the large language model-based troubleshooting agent in part by using the large language model-based troubleshooting agent to assess the network scenario in the test network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
  2.) Site Type B: a site connected to the network by the CE router via two primary links (e.g., from different Service Providers), with potentially a backup link (e.g., a 3G/4G/5G/LTE connection). A site of type B may itself be of different types:
  2a.) Site Type B1: a site connected to the network using two MPLS VPN links (e.g., from different Service Providers), with potentially a backup link (e.g., a 3G/4G/5G/LTE connection).
  2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
  2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
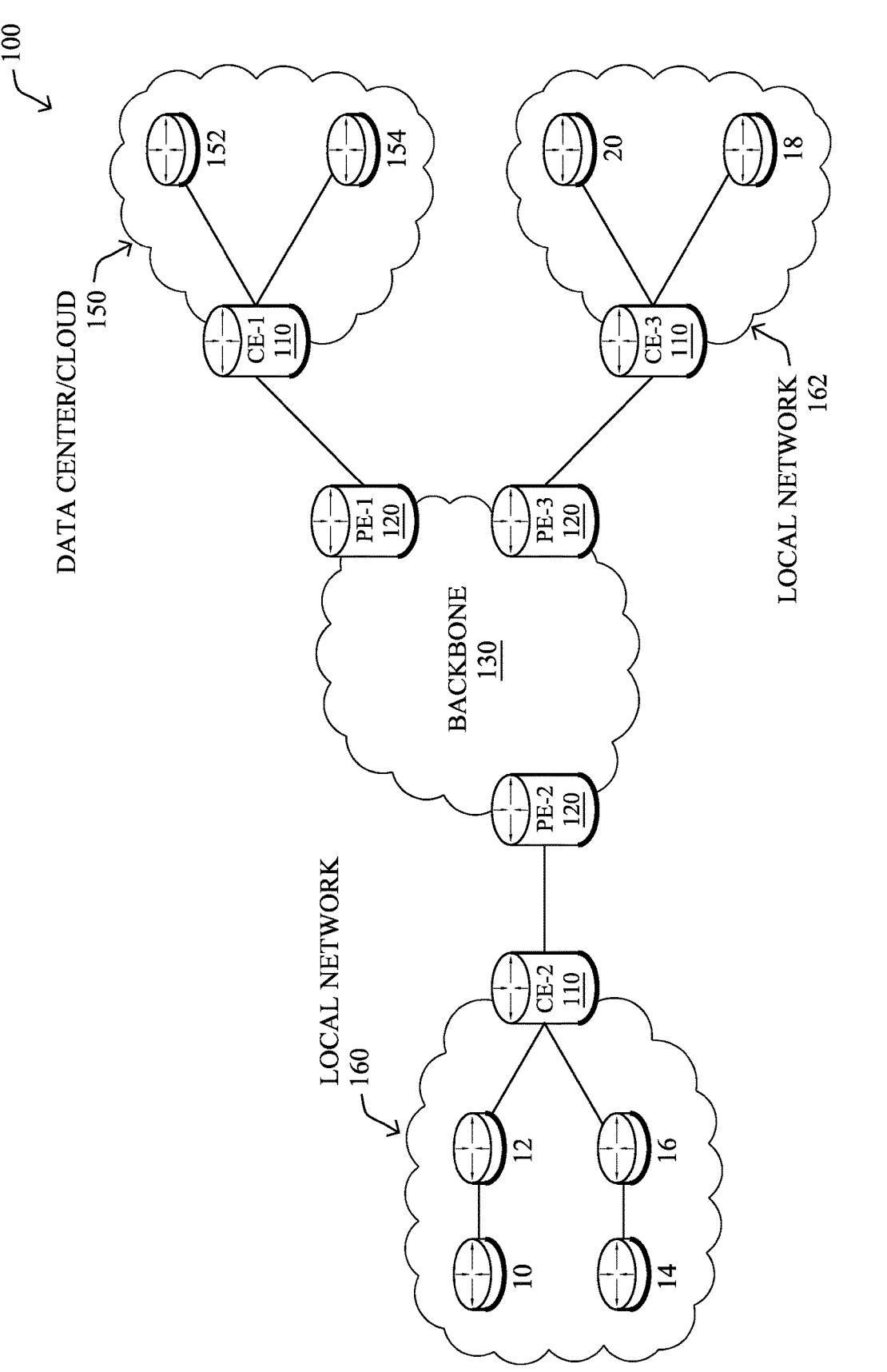

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
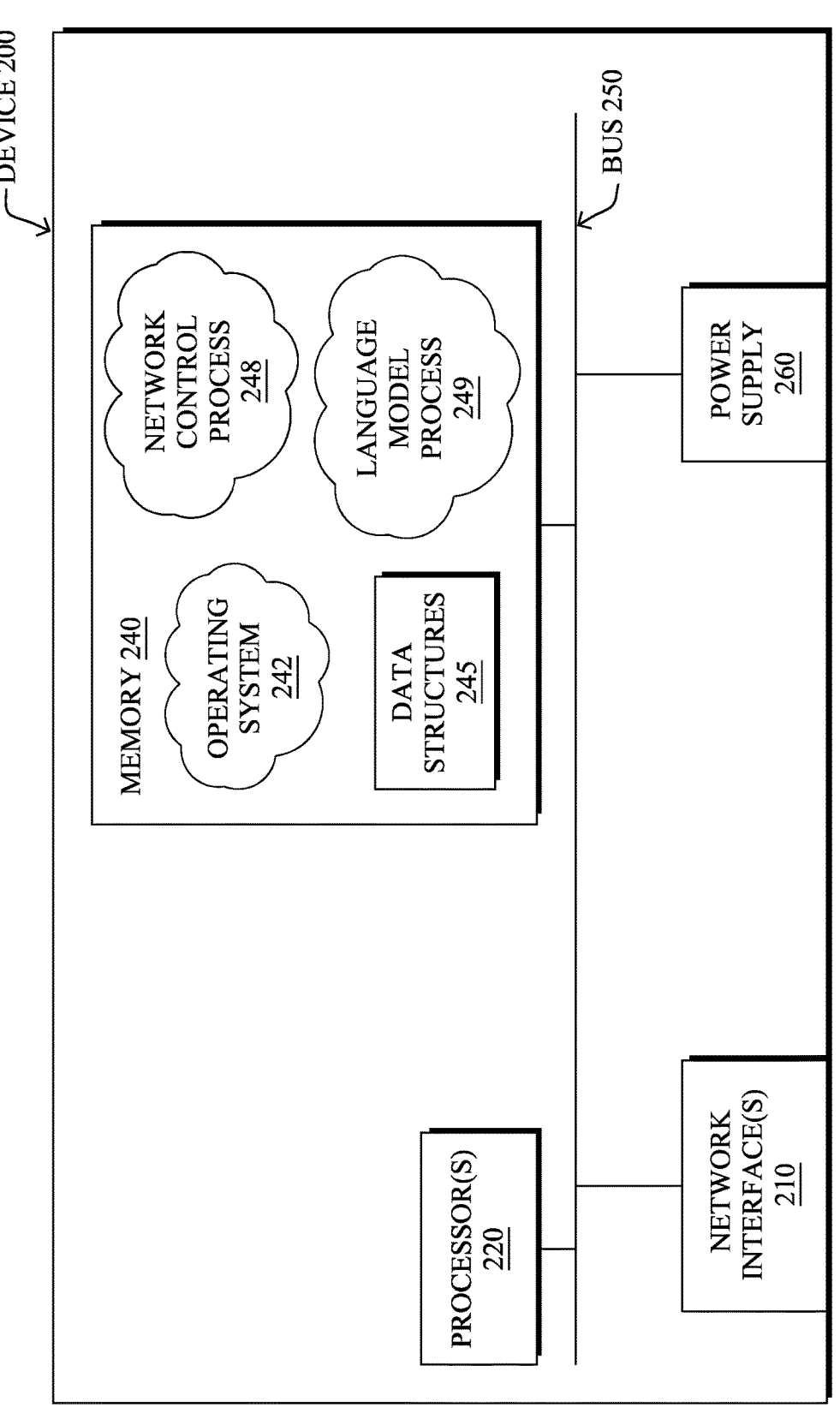
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
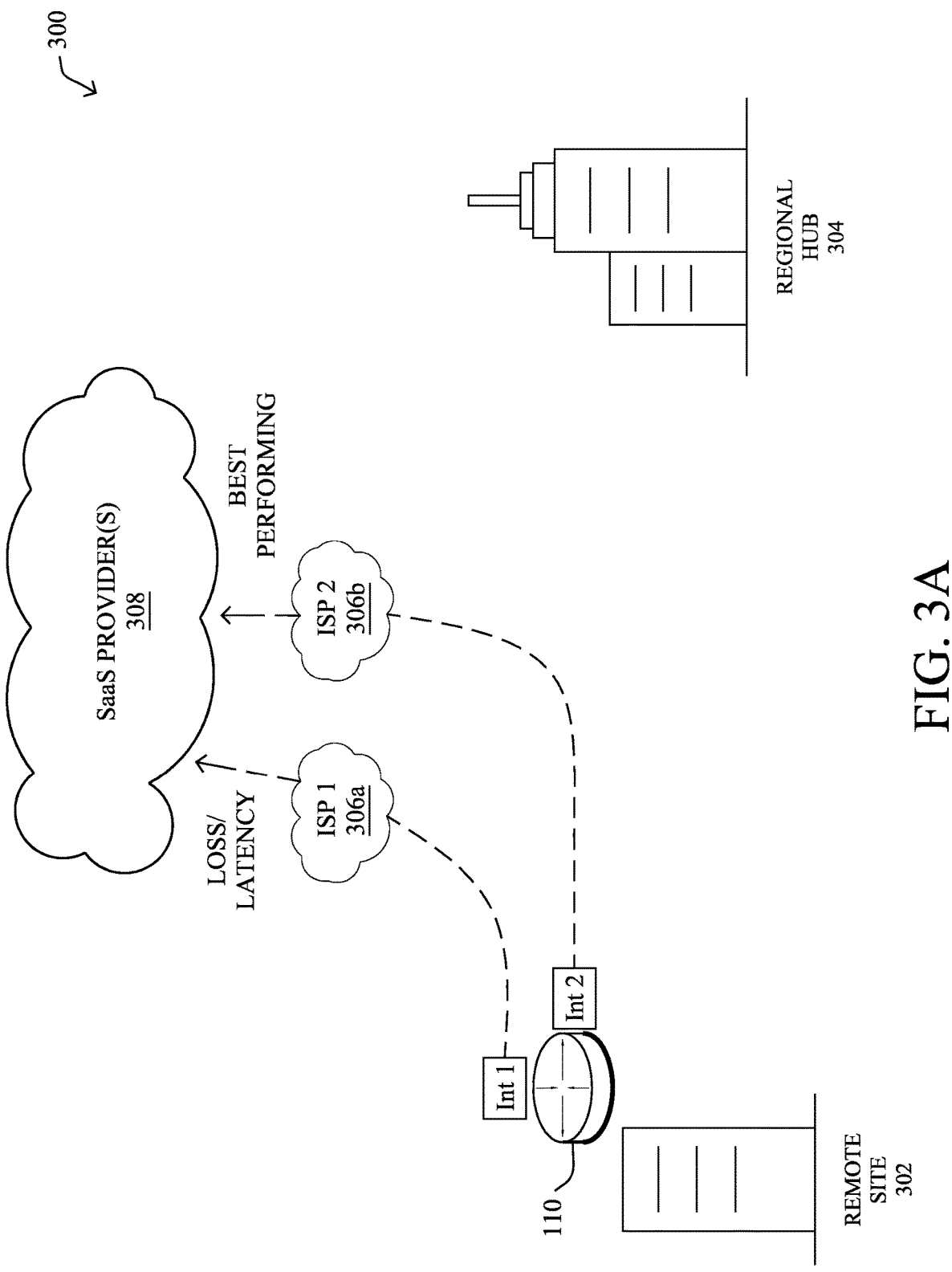
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g. public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
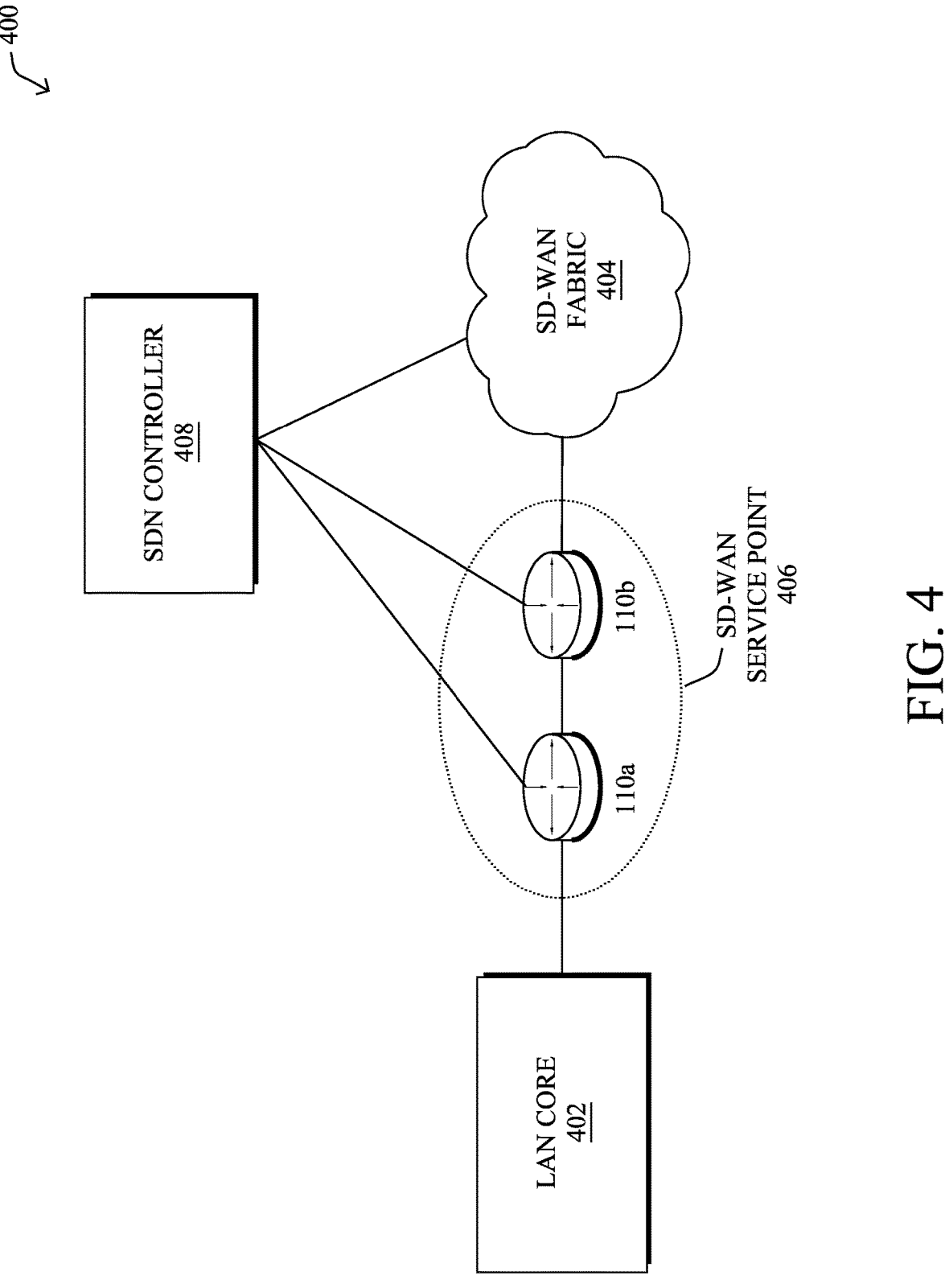
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet. MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

However, one major challenge of LLM-based troubleshooting agents is that, by default, they are unable to learn from past experiences. Consequently, such agents may continue to make the same mistakes over and over, without a mechanism to correct the agents over time. In a scenario where thousands of such agents are deployed, being able to learn from the experiences they are having in the field could be a very powerful mechanism to improve their performances over time.

Generating Network Scenarios to Train an LLM-based Network Troubleshooting Agent The techniques herein introduce a series of mechanisms to gather the experiences of multiple LLM-based agents and, when available, user feedback about their performances, to learn from them over time. For instance, if a user provides feedback that an agent displayed poor efficacy during a given scenario, the system may reproduce this scenario in a controlled environment, either automatically or with the help of subject matter experts (SMEs), to train new versions of the troubleshooting agent over time and improving its performance.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device receives feedback from a user regarding an output of a large language model-based troubleshooting agent for a network that the large language model-based troubleshooting agent generates in response to an input request from the user. The device determines a network scenario associated with the input request and the output. The device causes, based on the feedback, the network scenario to be replicated in a test network. The device updates the large language model-based troubleshooting agent in part by using the large language model-based troubleshooting agent to assess the network scenario in the test network.

Figure 5:
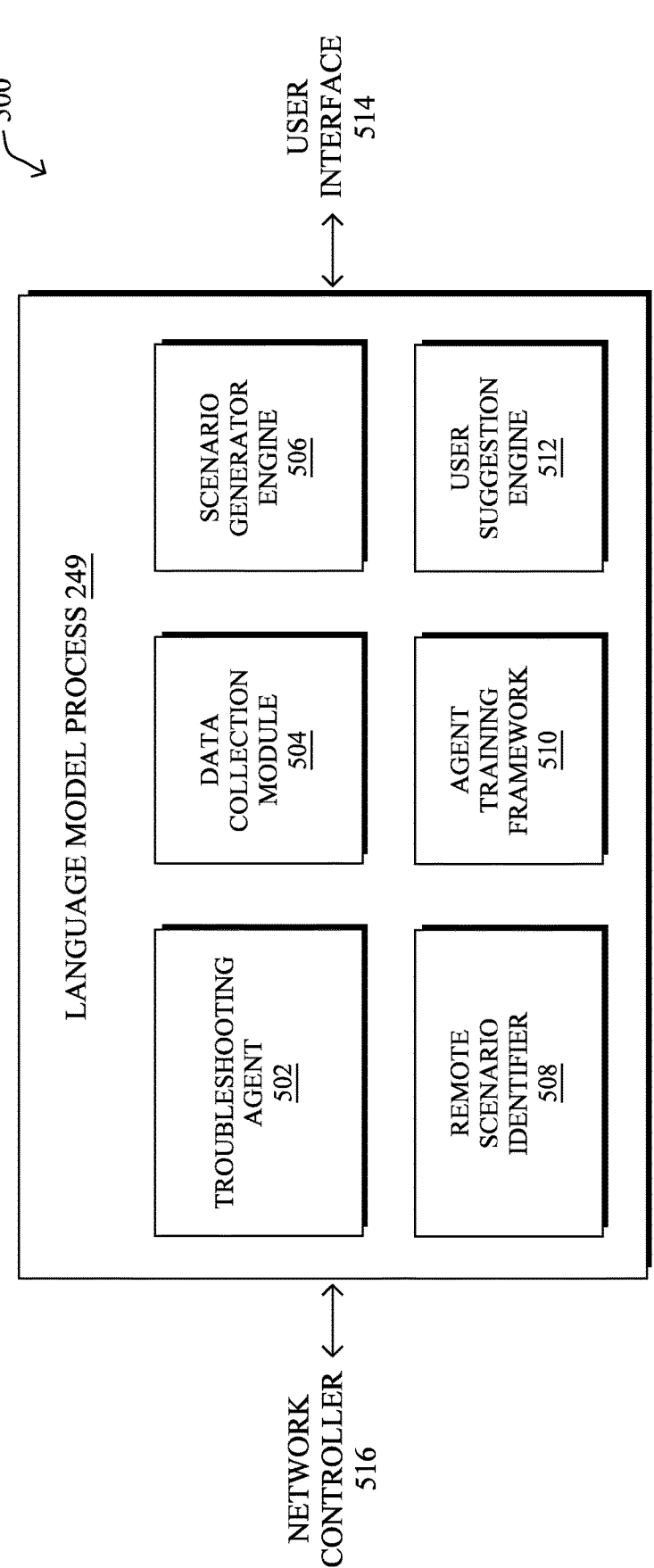
FIG. 5 illustrates an example architecture for generating network scenarios to train a large language model (LLM)-based network troubleshooting agent.

Operationally, FIG. 5 illustrates an example architecture for generating network scenarios to train a large language model (LLM)-based network troubleshooting agent, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 516, either locally or via a network, such as via one or more application programming interfaces (APIs), etc. In addition, language model process 249 may communicate with any number of user interfaces, such as user interface 514.

As shown, language model process 249 may include any or all of the following components: a troubleshooting agent 502, a data collection module 504, a scenario generator engine 506, a remote scenario identifier 508, an agent training framework 510, and/or a user suggestion engine 512. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,1. Consider the action ak="Check the priority queue length of a router," a static set of action ak,1 may be used to trigger a set of 1 action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:

Troubleshooting agent 502 retrieves the set of action Ai for the root cause of issue I after activating a timer T (max time to solve the issue)

Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

As would be appreciated, while troubleshooting agent 502 may be capable of performing complex troubleshooting tasks and, in some instances, taking automated action to correct issues in the network, its general functionality may also include tasks such as simply monitoring the status or performance of the network, as well as performing configuration changes, even in the absence of an existing issue.

In various implementations, data collection module 504 may be configured to obtain user questions/requests issued to troubleshooting agent 502, the sequence of actions performed by troubleshooting agent 502, and the final answers from troubleshooting agent 502. In addition, data collection module 504 may also obtain optional feedback from a user (e.g., in the form of a thumbs up/down, rating, freeform text, 1-5 rating, etc.) via user interface 514 or another medium (e.g., Webex chat, etc.). Ideally, the same channel used to communicate with troubleshooting agent 502 is used to collect the feedback.

In general, the feedback from a user may apply either to the final answer from troubleshooting agent 502, or to intermediate outputs that might have been produced by troubleshooting agent 502 (e.g., if troubleshooting agent 502 is logging intermediate troubleshooting steps that it is taking). Furthermore, data collection module 504 may also obtain additional context information in the form of network debug information such as technical support information, the latest configuration(s) of devices in the network, recent logs and alarms from devices of interest, or the like. In turn, data collection module 504 may store all of its collected data in a central datastore for use by the other components of language model process 249, as detailed below.

Scenario generator engine 506 may scan the questions in the datastore of data collection module 504 and use an LLM or other suitable model to strip certain information from them (e.g., usernames, hostnames, IP addresses, etc.), in order to make the questions generic. The questions are embedded using an encoder model (e.g., BERT) and used to retrieve the list of questions that are part of the training set used to train the agent stored in a vector database (e.g., ChromaDB, Pinecone, etc.). If no match is found, the question is added to a list of candidate questions to be added to the training set for troubleshooting agent 502

However, training troubleshooting agent 502 requires a question and a set of underlying network conditions/scenarios for the question to make sense. For instance, if the question is:

"My switch core-sw-01 is dropping traffic. Can you figure out why?" then a lab with a switch of the same model (or similar) as core-sw-01 is required, and one should reproduce conditions in which traffic dropping occurs.

For such complex situations, scenario generator engine 506 may mark these types of questions as "IRREPRODUCIBLE" and add them to a queue for a subject matter expert (SME) to review. The SME may then manually set up the corresponding network elements in the lab (or, in a virtual lab) and write a scenario to reproduce the issue. The context information collected by data collection module 504 may be used to generate the appropriate network topology, configuration and traffic load.

In other situations, scenario generator engine 506 might be able to find an existing network scenario or create a scenario dynamically, to reproduce the scenarios of interest. Here, an LLM could be prompted with the specific question and use retrieval augmented generation (RAG) to fetch relevant scenarios or capabilities of a troublemaker module, detailed below, to reproduce the problem without human intervention.

Figure 6:
FIG. 6 illustrates an example workflow for generating network scenarios.

FIG. 6 illustrates an example workflow for generating network scenarios, in some implementations. As shown, assume that there are any number of deployments 610, each of which may have its own troubleshooting agent 502 that an end user 602 interacts with by issuing a question 604, receiving an answer 606, and providing feedback 608 regarding answer 606. In turn, data collection module 504 may collect telemetry 612 that includes, for instance, question 604, the sequence of actions taken by troubleshooting agent 502 to address question 604, answer 606, feedback 608, and any associated network context data, as well. In turn, data collection module 504 stores telemetry 612 in datastore 614 (e.g., in a private or public cloud).

Scenario generator engine 506 may then scan the entries in datastore 614 and determine whether they are reproducible. In not, scenario generator engine 506 may send a notification 616 to an SME queue 618 for review. Conversely, scenario generator engine 506 may produce a test case 620 for any reproducible entry to train a new version of troubleshooting agent 502 using agent training framework 510. Such a test case 620 may include, for instance, a given network scenario and a question/input request for troubleshooting agent 502 to address under that scenario.

Referring again to FIG. 5, language model process 249 may optionally include a remote scenario identifier 508, which may be an extension of scenario generator engine 506. During execution, remote scenario identifier 508 may sample a number of actual network deployments running troubleshooting agent 502 where a given question may be interesting to run.

Given a generalized question derived by scenario generator engine 506, remote scenario identifier 508 may select networks with the required traits for the question to make sense. For example, if the question is about wireless performance, only networks with wireless network devices will be selected. Similarly, if the question is about the interaction between two specific domains, only the networks where both of those domains are available will be selected. This can be achieved using either embedding techniques, or more traditional bag-of-words techniques against a pre-defined set of keywords corresponding to customer network capabilities and enabled features. Remote scenario identifier 508 can then either use all of the selected customer networks or use sampling to reduce the number of customer networks.

Each network selected by remote scenario identifier 508 can then be registered as a potential scenario variation for the corresponding target question. This can greatly increase the number and diversity of the agent runs when re-training and evaluating the performance. The help of an SME may still be required to write automated assertions to validate answers of the model, though.

In various implementations, agent training framework 510 may trigger retraining of troubleshooting agent 502 on the new scenarios, either added automatically or manually. Once the new troubleshooting agent 502 is available, a message may be sent to all users who reported an issue to inform them that their feedback was included in the new revision. In some implementations, this may form a loop whereby users are encouraged to provide feedback owing to an explicit acknowledgement of past feedback.

Figure 7:
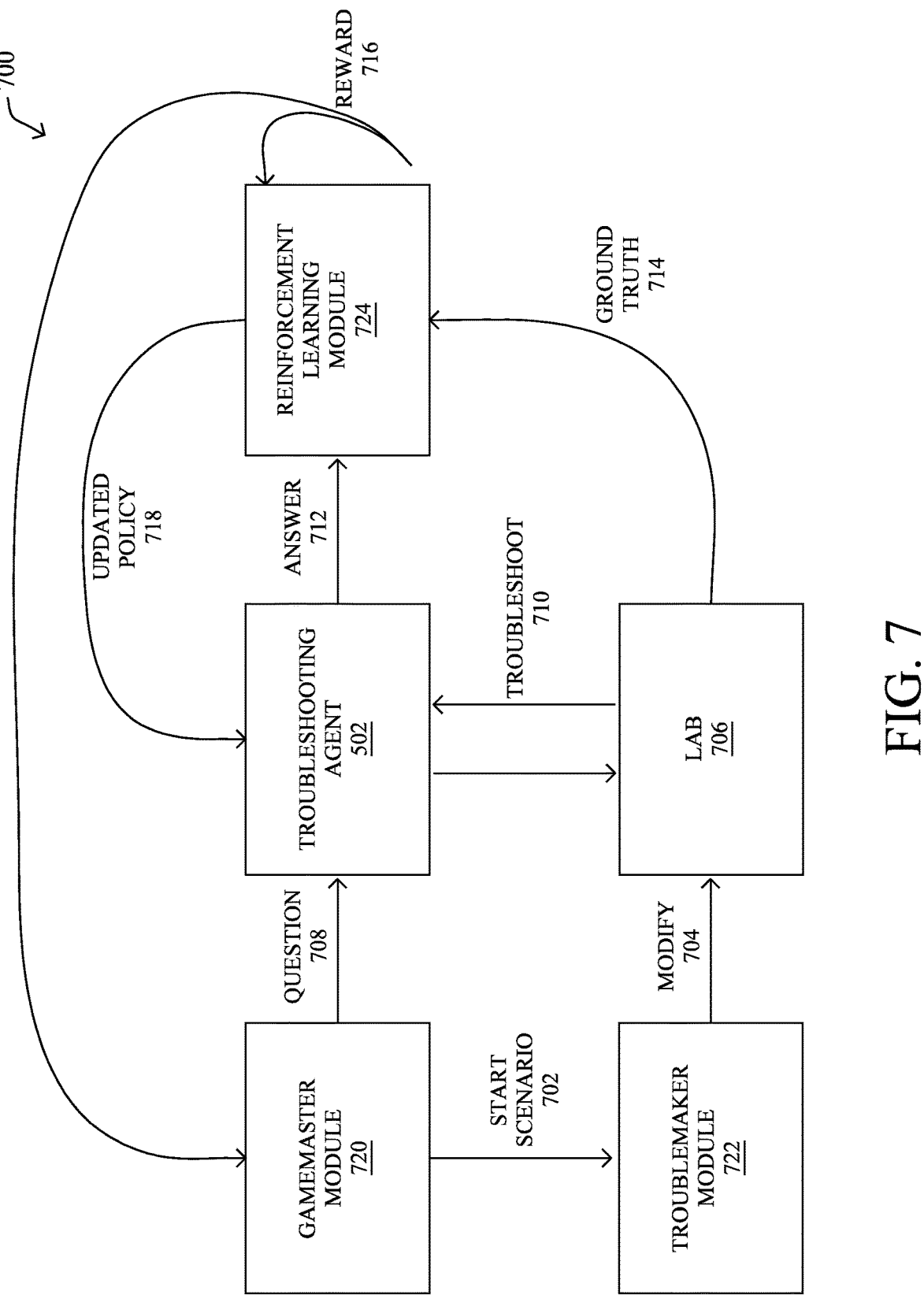
FIG. 7 illustrates an example architecture for an agent training framework.

FIG. 7 illustrates an example architecture for agent training framework 510, in various embodiments. As shown, agent training framework 510 may include various subcomponents, such as a gamemaster module 720, a troublemaker module 722, and/or a reinforcement learning module 724. As shown, gamemaster module 720 may initiate a game by sending an instruction 702 to troublemaker module 722 to start a new scenario, such as in accordance with a test case (e.g., test case 620) from scenario generator engine 506. In turn, troublemaker module 722 may send one or more messages 704 into the network 706, which is preferably a sandbox/lab environment, to instantiate the scenario. Next, gamemaster module 720 may issue a question 708 to troubleshooting agent 502 regarding the scenario, asking it to perform a task such as troubleshooting the scenario, retrieving certain information that pertains to the scenario, or even devise actions to correct the scenario.

By way of example, troubleshooting agent 502 may perform troubleshooting 710 by interfacing with one or more services or devices in network 706, to generate an answer 712 using its LLM(s), which it provides to reinforcement learning module 724 for analysis. Similarly, reinforcement learning module 724 may obtain ground truth information 714 regarding the scenario from network 706 and compare it to answer 712, to determine whether troubleshooting agent 502 was able to successfully address question 708. Based on this comparison, reinforcement learning module 724 may compute an updated policy for 718, in an effort to improve its functions. In addition, reinforcement learning module 724 may compute a reward 716 that it provides back to gamemaster module 720. In turn, gamemaster module 720 may use reward 716 to determine the next game to perform and its difficulty.

More specifically, a game may consist in gamemaster module 720 instructing troublemaker module 722 to perform some (malicious) changes to the network (e.g., a scenario) and asking troubleshooting agent 502 to either 1.) pinpoint the root cause or 2.) fix the issue altogether.

Note that a given scenario (e.g., a flapping switch port) can lead to multiple games of increasing difficulty depending on the question asked to gamemaster module 720. For instance, in the case of the scenario relating to a flapping switch port, various games related to this scenario may entail asking troubleshooting agent 502 to answer any of the following questions, which increase with difficulty:

Is port X of switch Y flapping?

Which port of switch Y is flapping?

Is there a switch port flapping?

There is a problem with switch Y, which one?

A key factor driving the difficulty of the scenario is the harmfulness of the generated impairment and, therefore, how easy it is to detect. Indeed, gamemaster module 720 may initiate scenarios with minor impairments to the network (e.g., by starting by injecting small error rates, a few link flaps in the network, or on the contrary, very strong impairments such as high rates of link flaps, error rate, node reboots, etc.) and increasing gradually the magnitude of these impairments.

Questions that gamemaster module 720 may send to troubleshooting agent 502 during any game may take any or all of the following:

1. Troubleshooting questions such as:
   User X sees packet loss to host 1.2.3.4. Can you determine why?
   User X has trouble connecting to Webex. Can you determine why?
2. Requests to perform certain actions such as:
   User X is complaining about poor Webex experience. Can you please fix the issue?
3. Requests to perform certain analyses, such as:
   Can you provide me the list of all users impacted by the same issue as X?

As would be appreciated, while the input to troubleshooting agent 502 from gamemaster module 720 is generally referred to herein as a "question," any such input may also take the form of a statement or other request and does not necessarily need to be in question form. Thus, as used herein, the term "question" is intended to be encompassing of these alternatives and refer generally to any input request for troubleshooting agent 502 during any given test/game.

In some implementations, troubleshooting agent 502 can also extend a question with hints, providing observations about the network that troubleshooting agent 502 can leverage directly (e.g., user X is connected to device Y, etc.).

As will be appreciated, the same network scenario may be associated with a wide range of games and difficulties. To this end, gamemaster module 720 may use a generative model, as well, to generate the following:

1. Scenario definition: which determines what the Troublemaker must execute. This may, for instance, take the form of a YAML file.
2. The question that the troubleshooting agent must answer.

Both of the above can be generated by gamemaster module 720 using an LLM, for instance, possibly with some generation constraints (e.g., for a YAML file). In some embodiments, gamemaster module 720 may select the scenario definition from a list of pre-defined scenarios. In other embodiments, troubleshooting agent 502 may simply modify pre-defined scenarios (e.g., by changing the circuit or device impacted). In more advanced embodiments, gamemaster module 720 may generate the whole scenario from scratch based on a known set of impairment capabilities of troublemaker module 722.

Referring again to FIG. 5, user suggestion engine 512 may allow end users to suggest the next steps for troubleshooting agent 502 when addressing a given question/input request. In this case, instead of a user providing feedback at the very end of the process, troubleshooting agent 502 may query the user as follows:

"It seems that I reached a dead end. Here is what I did so far:
   I figured that core-sw-01 is a Nexus 9500X switch, with a total utilization of 12.4% across all ports.
What would you suggest next?I'll happily follow your lead."

The user may then suggest a next step (e.g., "can you check whether the CPU usage is high, and which processes are causing it?"), which can act 1.) as a hint for continuing the execution and 2.) as a training sample if this eventually leads to a satisfactory answer.

At scale, such feedback can form an extremely valuable training dataset, as they represent relevant user issues that cannot be solved easily by troubleshooting agent 502. In essence, they are 'hard examples' that can help to speed up the learning process.

Figure 8:
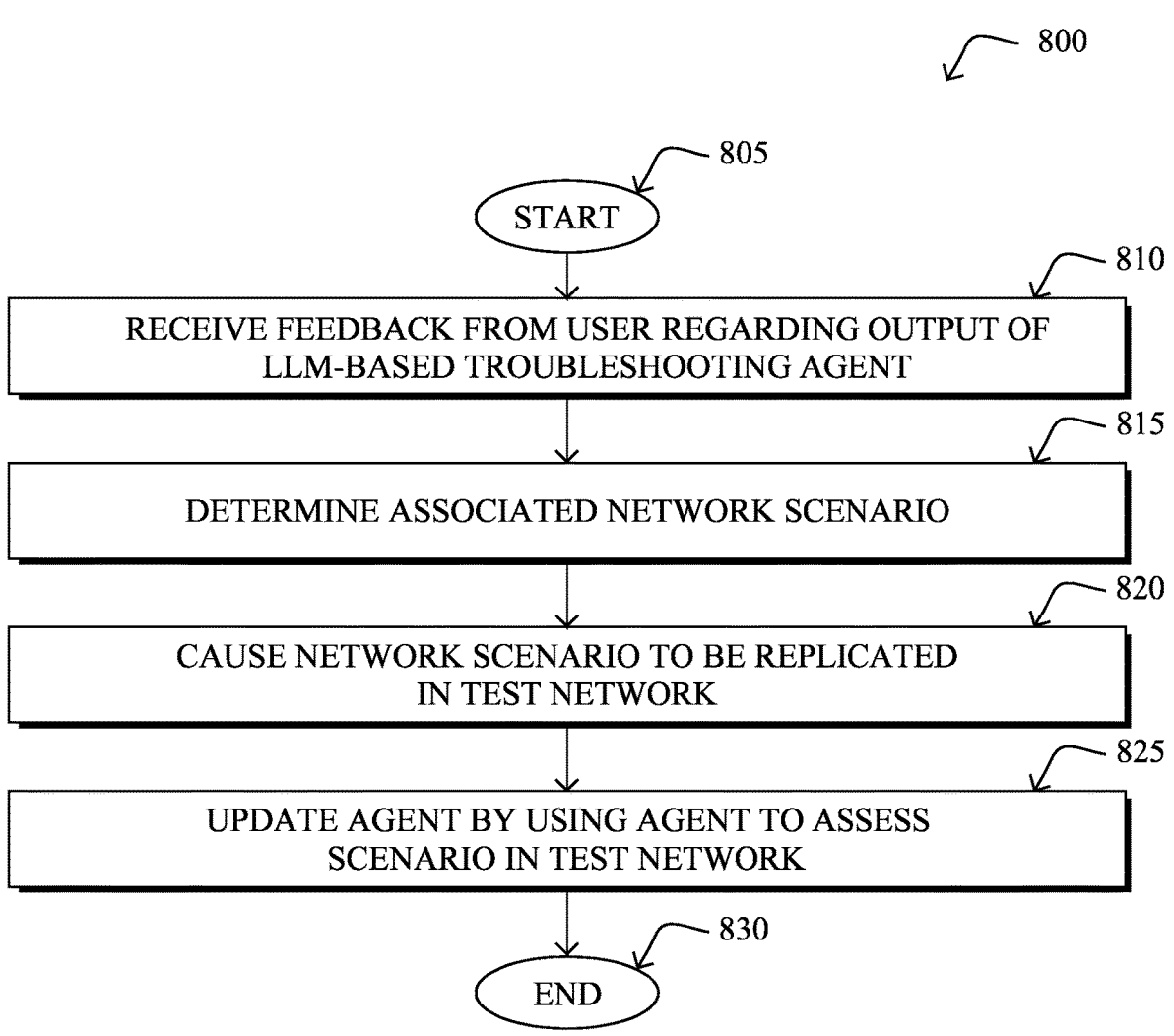
FIG. 8 illustrates an example simplified procedure for generating network scenarios to train an LLM-based network troubleshooting agent.

FIG. 8 illustrates an example simplified procedure (e.g., a method) for generating network scenarios to train an LLM-based network troubleshooting agent, in accordance with one or more implementations described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., language model process 249 and/or network control process 248). The procedure 800 may start at step 805, and continues to step 810, where, as described in greater detail above, the device may receive feedback from a user regarding an output of an LLM-based troubleshooting agent for a network that the LLM-based troubleshooting agent generates in response to an input request from the user. In one implementation, the output is a final answer by the LLM-based troubleshooting agent. In another implementation, the output is an intermediate output of the LLM-based troubleshooting agent. In a further implementation, the feedback from the user comprises a suggested step for the LLM-based troubleshooting agent to take.

At step 815, as detailed above, the device may determine a network scenario associated with the input request and the output. In some cases, the device may also receive network context data associated with the output of the LLM-based troubleshooting agent and uses the network context data to determine the network scenario.

At step 820, the device may cause, based on the feedback, the network scenario to be replicated in a test network, as described in greater detail above. In some cases, the device may do so by making a determination that network conditions in the network associated with the input request from the user cannot be reproduced in the test network and send a request, based on the determination, to set up the network scenario. In one implementation, the input request also references a node in the network of a particular type and the test network includes a node of the particular type.

At step 825, as detailed above, the device may update the LLM-based troubleshooting agent in part by using the LLM-based troubleshooting agent to assess the network scenario in the test network. In some instances, the device may form a generic input request based on the input request from the user, whereby the LLM-based troubleshooting agent assesses the network scenario in the test network using the generic input request. In various implementations, the device updates the LLM-based troubleshooting agent using reinforcement learning based on a result of an assessment of the network scenario in the test network. In some cases, the device may also notify the user that the LLM-based troubleshooting agent has been updated.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for generating network scenarios to train an LLM-based network troubleshooting agent, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
   receiving, at a device, feedback from a user regarding an output of a large language model-based troubleshooting agent configured to troubleshoot issues for a network, the output being generated by the large language model-based troubleshooting agent in response to an input request from the user for the large language model-based troubleshooting agent to troubleshoot an issue with the network;
   determining, based at least in part on the feedback, that the user was dissatisfied with the output from the large language model-based troubleshooting agent to troubleshoot the issue;
   receiving, at the device, network context data that represents a state of the network at a time corresponding to when the output was generated;
   determining, by the device, a network scenario associated with the input request and the output, based on network context data received by the device;
   causing, by the device and based on the user being dissatisfied, the network scenario to be replicated in a test network that is different than the network;
   causing, by the device, the large language model-based troubleshooting agent to assess the network scenario; and
   updating, by the device, the large language model-based troubleshooting agent in part by training the large language model-based troubleshooting agent to generate an accurate response to troubleshoot the issue expressed in the network scenario in the test network.

2. The method as in claim 1, further comprising:
   forming a generic input request based on the input request from the user, wherein the large language model-based troubleshooting agent assesses the network scenario in the test network using the generic input request.

3. The method as in claim 1, wherein the device updates the large language model-based troubleshooting agent using reinforcement learning based on a result of an assessment of the network scenario in the test network.

4. The method as in claim 1, wherein the device causes the network scenario to be replicated in the test network by:
   making a determination that network conditions in the network associated with the input request from the user cannot be reproduced in the test network; and
   sending a request, based on the determination, to set up the network scenario.

5. The method as in claim 1, wherein the device further receives the network context data associated with the output of the large language model-based troubleshooting agent.

6. The method as in claim 1, wherein the output is a final answer by the large language model-based troubleshooting agent.

7. The method as in claim 1, wherein the output is an intermediate output of the large language model-based troubleshooting agent.

8. The method as in claim 1, wherein the feedback from the user comprises a suggested step for the large language model-based troubleshooting agent to take.

9. The method as in claim 1, further comprising:
   notifying the user that the large language model-based troubleshooting agent has been updated.

10. The method as in claim 1, wherein the input request references a node in the network of a particular type, and wherein the test network includes a node of the particular type.

11. An apparatus, comprising:
   one or more network interfaces;
   a processor coupled to the one or more network interfaces and configured to execute one or more processes; and
   a memory configured to store a process that is executable by the processor, the process when executed configured to:
      receive feedback from a user regarding an output of a large language model-based troubleshooting agent configured to troubleshoot issues for a network, the output being generated by that-the large language model-based troubleshooting agent generates-in response to an input request from the user for the large language model-based troubleshooting agent to troubleshoot an issue with the network;
      determine, based at least in part on the feedback, that the user was dissatisfied with the output from the large language model-based troubleshooting agent to troubleshoot the issue;
      receive network context data that represents a state of the network at a time corresponding to when the output was generated;
      determine a network scenario associated with the input request and the output, based on network context data received by the apparatus;
      cause, based on the user being dissatisfied, the network scenario to be replicated in a test network that is different than the network;
      cause the large language model-based troubleshooting agent to assess the network scenario; and
      update the large language model-based troubleshooting agent in part by training the large language model-based troubleshooting agent to generate an accurate response to troubleshoot the issue expressed in the network scenario in the test network.

12. The apparatus as in claim 11, wherein the process when executed is further configured to:

form a generic input request based on the input request from the user, wherein the large language model-based troubleshooting agent assesses the network scenario in the test network using the generic input request.

13. The apparatus as in claim 11, wherein the apparatus updates the large language model-based troubleshooting agent using reinforcement learning based on a result of an assessment of the network scenario in the test network.

14. The apparatus as in claim 11, wherein the apparatus causes the network scenario to be replicated in the test network by:

making a determination that network conditions in the network associated with the input request from the user cannot be reproduced in the test network; and sending a request, based on the determination, to set up the network scenario.

15. The apparatus as in claim 11, wherein the apparatus further receives network context data associated with the output of the large language model-based troubleshooting agent.

16. The apparatus as in claim 11, wherein the output is a final answer by the large language model-based troubleshooting agent.

17. The apparatus as in claim 11, wherein the output is an intermediate output of the large language model-based troubleshooting agent.

18. The apparatus as in claim 11, wherein the feedback from the user comprises a suggested step for the large language model-based troubleshooting agent to take.

19. The apparatus as in claim 11, wherein the process when executed is further configured to:

notify the user that the large language model-based troubleshooting agent has been updated.

20. A tangible, non-transitory, computer-readable medium storing program instructions that cause a device to execute a process comprising:

receiving, at a device, feedback from a user regarding an output of a large language model-based troubleshooting agent configured to troubleshoot issues for a network, the output being generated by the large language model-based troubleshooting agent in response to an input request from the user for the large language model-based troubleshooting agent to troubleshoot an issue with the network;

determining, based at least in part on the feedback, that the user was dissatisfied with the output from the large language model-based troubleshooting agent to troubleshoot the issue;

receiving, at the device, network context data that represents a state of the network at a time corresponding to when the output was generated;

determining, by the device, a network scenario associated with the input request and the output, based on network context data received by the device;

causing, by the device and based on the user being dissatisfied, the network scenario to be replicated in a test network that is different than the network;

causing, by the device, the large language model-based troubleshooting agent to assess the network scenario; and updating, by the device, the large language model-based troubleshooting agent in part by training the large language model-based troubleshooting agent to generate an accurate response to troubleshoot the issue expressed in the network scenario in the test network.

* * * * *